(12) United States Patent
Chien

(10) Patent No.: US 12,331,896 B2
(45) Date of Patent: Jun. 17, 2025

(54) LED PLUG-IN OUTLET OR DC POWER LIGHT HAS LED-UNIT(S)

(71) Applicant: Tseng-Lu Chien, Walnut, CA (US)

(72) Inventor: Tseng-Lu Chien, Walnut, CA (US)

(73) Assignees: Aaron Chien, Walnut, CA (US); Hsin-Yi Wang, Walnut, CA (US); Te-Ju Chien, Walnut, CA (US)

( * ) Notice: Subject to any disclaimer, the term of this patent is extended or adjusted under 35 U.S.C. 154(b) by 117 days.

(21) Appl. No.: 15/995,423

(22) Filed: Jun. 1, 2018

(65) Prior Publication Data
US 2018/0275500 A1    Sep. 27, 2018

Related U.S. Application Data

(60) Division of application No. 14/968,250, filed on Dec. 14, 2015, now abandoned, which is a
(Continued)

(51) Int. Cl.
*F21S 4/28*   (2016.01)
*F21S 8/00*   (2006.01)
(Continued)

(52) U.S. Cl.
CPC ............... *F21S 4/28* (2016.01); *F21S 8/035* (2013.01); *F21S 8/038* (2013.01); *F21S 9/022* (2013.01); *F21S 10/002* (2013.01); *F21V 14/02* (2013.01); *F21V 21/08* (2013.01); *F21V 21/14* (2013.01); *F21V 23/04* (2013.01); *F21V 29/00* (2013.01); *G01S 3/7864* (2013.01); *G03B 21/142* (2013.01); *G03B 21/145* (2013.01);
(Continued)

(58) Field of Classification Search
CPC .......... F21S 8/035; F21S 10/02; F21S 10/023; F21S 4/28; F21K 9/232; F21V 21/08; F21V 21/22; F21V 14/006; F21V 14/08
See application file for complete search history.

(56) References Cited

U.S. PATENT DOCUMENTS 3,539,798 A   11/1970 Perry
4,177,500 A   12/1979 Nicholl et al.
(Continued)

*Primary Examiner* — Bao-Luan Q Le
(74) *Attorney, Agent, or Firm* — BACON & THOMAS, PLLC

(57) ABSTRACT

The LED plug-in outlet or DC power light has LED-unit(s) to offer one or more than one near-by lighted-location(s) with preferred adjustable angle constriction and each of said LED-unit(s) has built-in plurality of the said dip or chip or dice or COB LED(s) to emit directly or in-directly LED light-beam from big surface of the said each of LED-unit(s) to supply consumer for one LED light offer one or more than one near-by lighted locations for desired or selected-functions, light color(s), brightness(es), light performance(s) while incorporate with circuitry, AC-to-DC circuit, IC, and control device select from sensor, motion sensor, photo sensor, sound sensor, power fail circuit, switch, wireless controller with APP software to make setting or adjustment or selection to make the LED light to turn-on/off, fade-in and fade-out, high-low brightness, motion or non-motion selection, change functions from variety pre-programed functions to offer near-by locations which is less than 30 feet and brightness is less than 100 CD from each of the said LED unit(s).

10 Claims, 3 Drawing Sheets

Figure 1:
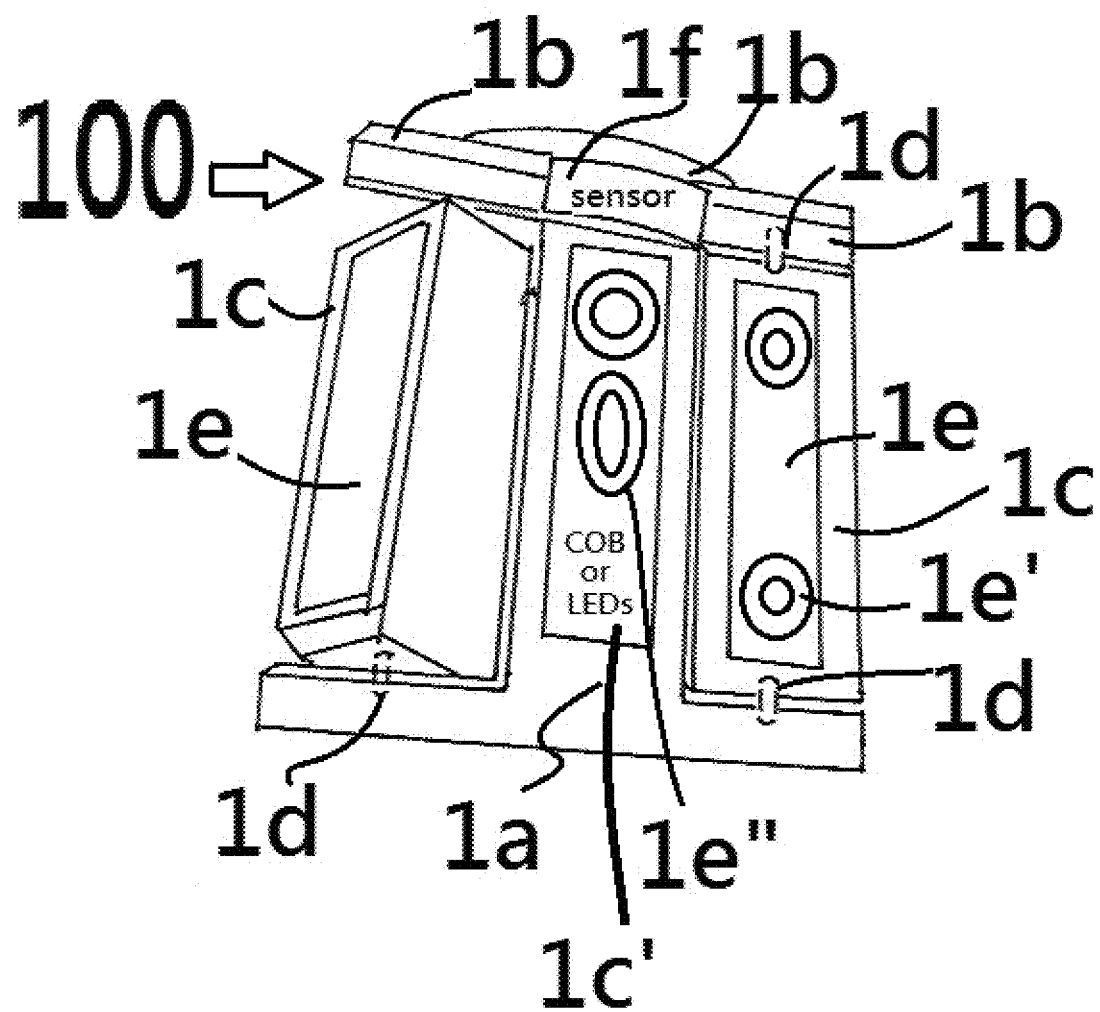

Related U.S. Application Data continuation-in-part of application No. 14/944,953, filed on Nov. 18, 2015, now Pat. No. 10,509,304, and a continuation-in-part of application No. 14/817,675, filed on Aug. 4, 2015, now Pat. No. 10,505,326, which is a continuation-in-part of application No. 13/910,295, filed on Jun. 5, 2013, now Pat. No. 9,732,921, said application No. 14/944,953 is a continuation-in-part of application No. 12/866,832, filed on Aug. 9, 2010, which is a continuation-in-part of application No. 12/771,003, filed on Apr. 30, 2010, now Pat. No. 8,408,736.

(51) Int. Cl.

| | | |
|---|---|---|
| *F21S 9/02* | (2006.01) | |
| *F21S 10/00* | (2006.01) | |
| *F21V 14/02* | (2006.01) | |
| *F21V 21/08* | (2006.01) | |
| *F21V 21/14* | (2006.01) | |
| *F21V 23/04* | (2006.01) | |
| *F21V 29/00* | (2015.01) | |
| *G01S 3/786* | (2006.01) | |
| *G03B 21/14* | (2006.01) | |
| *G03B 21/20* | (2006.01) | |
| *G03B 29/00* | (2021.01) | |
| *H04N 9/31* | (2006.01) | |
| *F21V 9/08* | (2018.01) | |
| *F21V 21/22* | (2006.01) | |
| *F21V 21/29* | (2006.01) | |
| *F21V 21/30* | (2006.01) | |
| *F21W 121/00* | (2006.01) | |
| *F21Y 101/00* | (2016.01) | |
| *F21Y 115/10* | (2016.01) | |
| *F21Y 115/30* | (2016.01) | |

(52) U.S. Cl.
CPC ..... *G03B 21/2033* (2013.01); *G03B 21/2046* (2013.01); *G03B 21/2053* (2013.01); *G03B 21/206* (2013.01); *G03B 21/208* (2013.01); *G03B 29/00* (2013.01); *H04N 9/3141* (2013.01); *F21V 9/08* (2013.01); *F21V 21/22* (2013.01); *F21V 21/29* (2013.01); *F21V 21/30* (2013.01); *F21V 23/0471* (2013.01); *F21V 23/0492* (2013.01); *F21W 2121/00* (2013.01); *F21Y 2101/00* (2013.01); *F21Y 2115/10* (2016.08); *F21Y 2115/30* (2016.08); *Y10S 362/80* (2013.01)

(56) References Cited

U.S. PATENT DOCUMENTS

| | | | | |
|---|---|---|---|---|
| 5,218,388 | A | | 6/1993 | Purdy |
| 5,268,829 | A | | 12/1993 | Lo |
| 5,508,490 | A | | 4/1996 | Klose |
| 5,517,264 | A | | 5/1996 | Sutton |
| 5,535,230 | A | | 7/1996 | Abe |
| 5,926,440 | A | * | 7/1999 | Chien .............. F21S 8/035 362/253 |
| 6,008,732 | A | * | 12/1999 | Lam ............... F21V 23/0442 340/815.4 |
| 6,010,228 | A | | 1/2000 | Blackman et al. |
| 6,072,606 | A | | 6/2000 | Huether et al. |
| 6,140,934 | A | * | 10/2000 | Lam ............... H05B 47/105 340/815.4 |
| 6,351,077 | B1 | | 2/2002 | Koyama |
| 6,364,501 | B1 | | 4/2002 | Tai |
| 6,390,647 | B1 | | 5/2002 | Shaefer |
| 6,420,974 | B1 | | 7/2002 | Baker et al. |
| 6,431,719 | B1 | * | 8/2002 | Lau ............... A61M 21/02 362/23.18 |
| 6,727,814 | B2 | | 4/2004 | Saltzstein et al. |
| 6,736,531 | B2 | | 5/2004 | Wallach |
| 6,824,296 | B2 | * | 11/2004 | Souza ............. F21S 8/035 362/282 |
| 6,874,907 | B2 | * | 4/2005 | Liao .............. F21L 4/08 362/183 |
| 6,965,205 | B2 | | 11/2005 | Piepgras et al. |
| 7,232,251 | B2 | * | 6/2007 | Chien ............. A41G 1/005 362/641 |
| 7,267,444 | B2 | | 9/2007 | Black, Jr. |
| 7,390,092 | B2 | | 6/2008 | Belliveau |
| 7,455,444 | B2 | * | 11/2008 | Chien ............. A61L 9/03 362/641 |
| 7,456,499 | B2 | * | 11/2008 | Loh ............... H01L 33/644 257/710 |
| 7,553,062 | B2 | * | 6/2009 | Spartano ........... F21S 8/035 174/67 |
| 7,568,829 | B2 | * | 8/2009 | Chien ............. F21S 8/035 362/641 |
| 7,611,253 | B2 | * | 11/2009 | Chien ............. F21S 8/035 362/276 |
| 7,798,678 | B2 | * | 9/2010 | Destain ............ H01L 33/58 362/268 |
| 7,909,477 | B2 | * | 3/2011 | Chien ............. F21V 23/04 362/101 |
| 8,029,182 | B2 | * | 10/2011 | Chien ............. F21K 9/232 362/101 |
| 8,446,004 | B2 | * | 5/2013 | Loh ............... H01L 33/644 257/706 |
| 2004/0017677 | A1 | * | 1/2004 | Krietzman ........ F21V 33/0052 362/85 |
| 2004/0145890 | A1 | * | 7/2004 | Liao .............. F21L 4/08 362/183 |
| 2005/0117343 | A1 | * | 6/2005 | Leifer ............ F21V 23/0442 362/276 |
| 2005/0269587 | A1 | * | 12/2005 | Loh ............... H01L 33/486 257/99 |
| 2006/0221617 | A1 | * | 10/2006 | Chien ............. F21V 23/04 362/311.03 |
| 2007/0152231 | A1 | * | 7/2007 | Destain ............ H01L 33/58 257/99 |
| 2007/0216274 | A1 | * | 9/2007 | Schultz ........... H05K 1/0209 313/46 |
| 2008/0068822 | A1 | * | 3/2008 | Spartano .......... F21S 8/035 362/95 |
| 2008/0092800 | A1 | * | 4/2008 | Smith ............. H05B 47/19 116/202 |
| 2008/0283861 | A1 | * | 11/2008 | Loh ............... H01L 33/486 257/98 |
| 2009/0154148 | A1 | * | 6/2009 | Meyer ............. F21S 9/02 362/157 |
| 2009/0180271 | A1 | * | 7/2009 | Jachmann ......... F21L 4/085 362/20 |
| 2009/0225568 | A1 | * | 9/2009 | Spartano .......... F21S 8/035 362/641 |
| 2009/0310383 | A1 | * | 12/2009 | Chien ............. F21K 9/232 362/644 |
| 2011/0160553 | A1 | * | 6/2011 | Talbot ............ A61B 5/14532 600/365 |
| 2012/0061709 | A1 | * | 3/2012 | Pachler ........... H01L 33/60 257/98 |

* cited by examiner

LED PLUG-IN OUTLET OR DC POWER LIGHT HAS LED-UNIT(S)

US PARENT CASE

This is Division filing case of (#TT-2) U.S. application Ser. No. 14/968,250, Filed on Dec. 14, 2015 which is Continue in Part of (#TT-1) U.S. application Ser. No. 14/944,953 Filed on Nov. 18, 2015 which is Continue in Part of (#TT-2010) U.S. application Ser. No. 12/866,832, Filed on Sep. 21, 2010 This is Division filing for LED project light to project light beams to more than one areas)

(#QQ-10) U.S. application Ser. No. 12/771,003 Filed on Apr. 30, 2010 Public on Nov. 4, 2010, Public No. 2010/027-7089 for project LED light-beam, lighted pattern, lighted image.

(#VVV-1) U.S. application Ser. No. 14/817,675 Filed on Aug. 4, 2015 Public on Nov. 26, 2015 Public No. 2015/034/0826.

This is CIP of Application No. (#VVV-2013) U.S. application Ser. No. 13/910,295 filed on Jun. 5, 3023 now is U.S. Pat. No. 9,732,921 issued on Aug. 15, 2017.

BACKGROUND

This is Division for co-inventor plurality of parent filed case.

The current LED light for night time at market only offer one area or location for near-by illumination purpose not the project LED or-and Laser light-beam like co-inventor co-pending to remote and distanced locations.

The current invention apply the Dip or Dice or Chip LEDs or COB (Chip On Board) LEDs to emit light beam through LED light more than one of opening(s), lens, windows (Not punch through like openings) to near-by areas not same as co-inventor co-pending LED light beam or patterns or images project to remote distanced locations by one convex or project optics-lens to not show the near-by illumination but only the remote away distanced locations.

The current invention is $1^{st}$ one to apply the COB LED(s) for plug-in outlet night light and the current invention solve the dip or dice or chip LEDs bright spot-points for short distance to lens and also solve the dip or dice or chip LEDs big labor for soldering each small PCB to main PCB while the LED light need to have multiple direction light-beam emitting. The COB is so simple to solve the brighter-sports problem, and also more earlier to use more than one piece COB to face desired multiple of directions than traditional skill to solder tiny-PCB of chip or dice to assembly to Main-PCB.

The current invention is the $1^{st}$ one of the night time use LED light or plut-into outlets night light to use LED light has more than one of the opening(s) (Punch through), lens, windows (not punch through like openings) emit out the light-beam to illuminate the near-by more than one locations.

The current invention is the $1^{st}$ one has the different housing or parts has angle adjustable to emit more than one LED light-beam to outside the LED light.

The current invention offer one LED light cost but offer for more than one locations has near-by illumination with or without angle adjustable features or-and other preferred add-on one or more than one of functions select from (1) Motions sensor or other sensor function, (2) photo sensor, (3) Switch on/off, (4) wireless control function by Wifi, APP, Z-way, Zig-Bee, infra-red, RF circuitry, (5) power fail or emergency or evacuation light functions, (6) color changing, color freeze function, (7) changing functions between more than one of functions such as party light, illumination light, chasing light, fade-in or fade-out light, hi-low brightness, color-selection, illumination or strong-strobe light, motion or non-motion, or other different functions to change by operated switch, remote controller, pre-setting IC.

The current invention is the $1^{st}$ one has the . . .

BRIEF DRAWING

Figure 2:
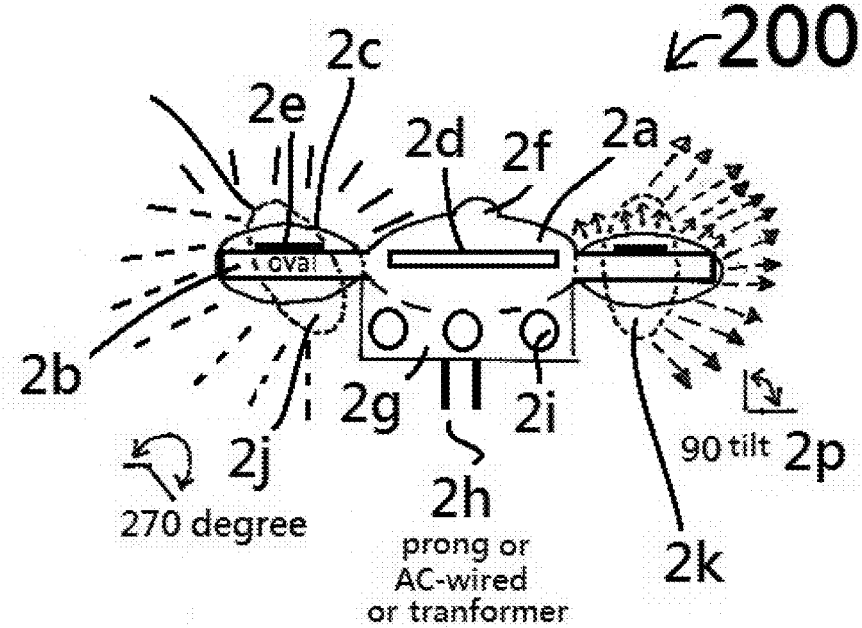
Figure 3:
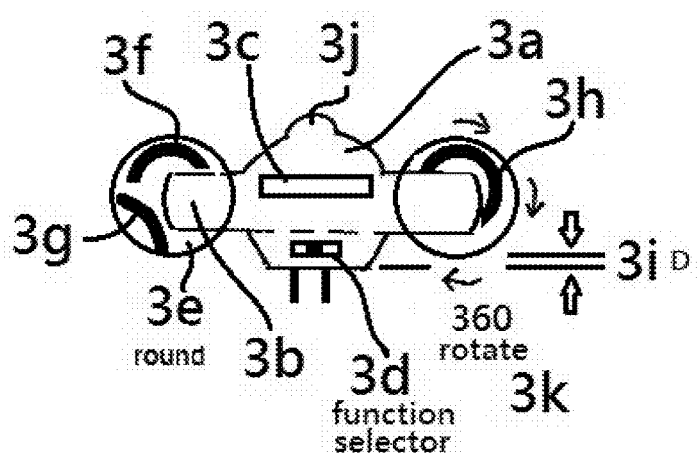
Figure 4:
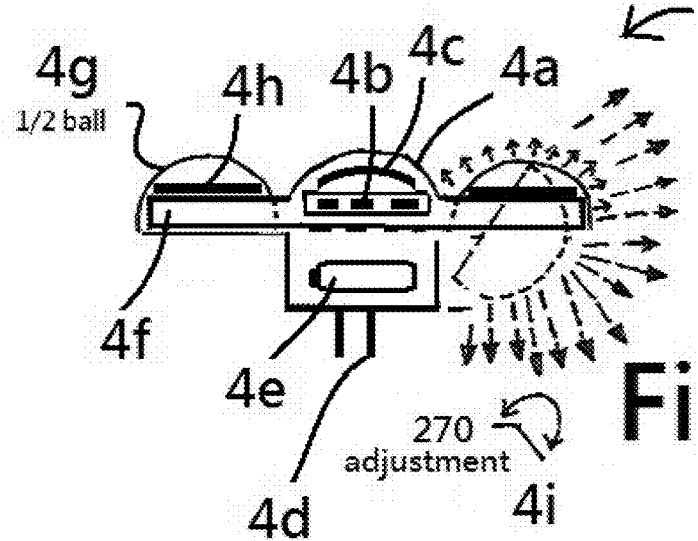
Figure 5:
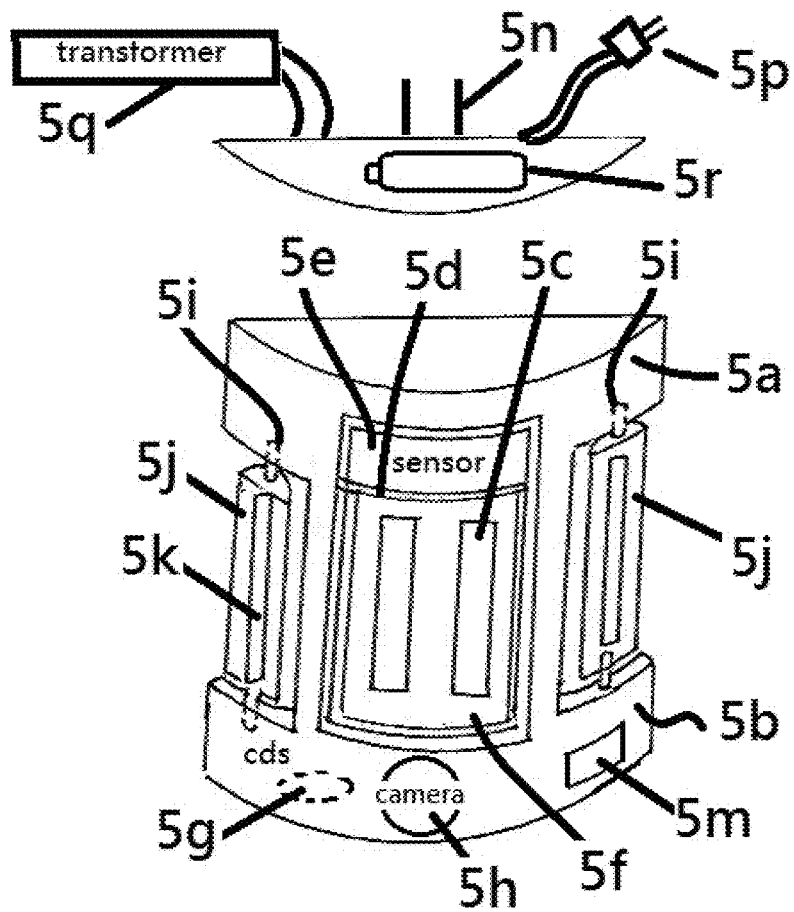
Figure 6:
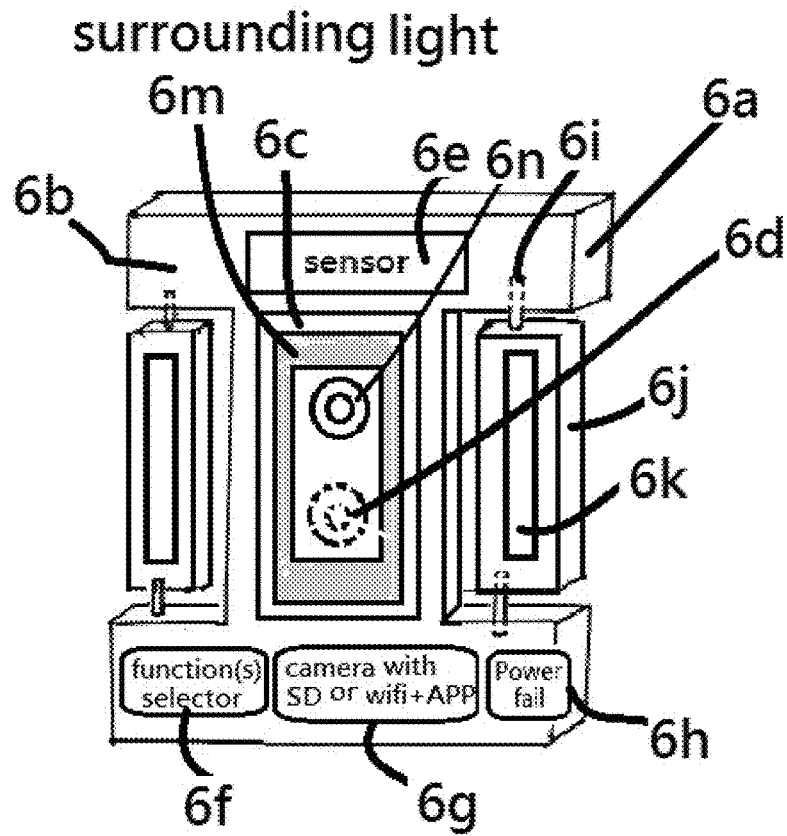

1. FIG. 1 is $1^{st}$ embodiment for current invention,
2. FIGS. 2, 3, 4 is detail construction for Oval-unit for 90 degree tilt to offer lighted light beam or patterns or image for more than one area(s) for illumination.
3. FIGS. 5, 6 disclosure the preferred two of many other embodiment has alternative or equal functions or replaceable embodiments with desired functions.

DETAILS DESCRIPTION

This is Division filing case of (#TT-2) U.S. application Ser. No. 14/968,250, Filed on Dec. 14, 2015 which is Continue in Part of (#TT-1) U.S. application Ser. No. 14/944,953 Filed on Nov. 14, 2015 which is Continue in Part of (#TT-2010) U.S. application Ser. No. 12/866,832, Filed on Sep. 21, 2010 This is Division filing for LED project light to project light beams to more than one areas)

(#QQ-10) U.S. application Ser. No. 12/771,003 Filed on Apr. 30, 2010 Public on Nov. 4, 2010, Public No. 2010/027-7089 for project LED light-beam, lighted pattern, lighted image. Basing on Co-inventor co-pending above case FIGS. 10, and 11, and FIGS. 23 to FIG. 38 for LED light has remote distance lighted-areas from main/side/top/bottom project-assembly with optics-lens to create for focus of LED lighting. The Co-Pending case has LED light-beam focus properties and can not offer the near-by illumination areas, the Co-pending filed case for projection have to use one light source because had the light-beam focus function so can not use COB LED(s) which will make different focusing and make GHOST-Shadow for project light beams.

(#VVV-1) U.S. application Ser. No. 14/817,675 Filed on Aug. 4, 2015 Public on Nov. 26, 2015 Public No. 2015/034/0826.

This is CIP of Application No. (#VVV-2013) U.S. application Ser. No. 13/910,295 filed on Jun. 5, 3023 now is U.S. Pat. No. 9,732,921 issued on Aug. 15, 2017.

The Co-inventor Co-pending case is for wall cover LED light has built-in USB or wifi, camera, APP or outlets which only has the main LED-unit without side/top/bottom light. Also, The Pending case has no any COB LEDs which has a lot of features to make simple and easily for LED light-beam.

The Co-inventor Earlier U.S. Pat. No. 8,029,182 U.S. application Ser. No. 12-546,012 which has more than one LED light source emit from different window or openings. The Co-inventor prior art use Dip LED which has too many trouble as above discussion. The U.S. Pat. No. 8,029,182 is CIP filed case of U.S. Pat. No. 7,909,477 and U.S. application Ser. No. 11/094,215 Filed on Mar. 21, 2005. On 2005 without COB LED(s) at that parent filed case U.S. Pat. No. 7,909,477, so the Dip LED light source shown on the U.S. Pat. No. 7,909,477 or Child U.S. Pat. No. 8,029,182 all only can use Dip LED-units which is Bulk and which not easily to form a Surface light for big space and narrow height or thickness of LED plug-in or LED DC power night time or dark environment applications. Also, The COB LEDs easily to make surface or area light without the Strong bright-spots, less soldering points or-and labor. The COB LED(s) nice and net and attractive coating colors for high-tech value. These all the Co-inventor prior arts dip-LEDs difficult to solve and work out for super thin night light house space without the brighter-spots.

The current invention has following feature:
a. Apply COB (Chip On-Board) LED which solve
  (a-1) Traditional Dip or Chip LED which has the bright spots issues. The COB LED has much better solve the bright spots issues especially for short distance application.
  (a-2) Traditional Dip or Dice or Dip LED for soldering work on small PCB and assembled to Main PCB to get multiple directions LED light-beam, COB can be any width or length and geometric shape so prevent from soldering plurality or number of chip, dice, dip LEDs so many soldering work. This is big issued for manufacturing cost for labor to assembly individual LED-on board to solder or assembly to main-PCB.
b. The current Night time use LED light has more than one of areas, sections, openings, windows (not punch through called windows, not opening which is punch through) and COB or Chips LED or Dip LEDs inside to emit light out.
c. The current Night time use LED light has more than one lighted-areas on the said LED light including one or more of the said main-housing light, or side lights, or top light, or bottom light install on the said LED light which only little cost increase but for consumer buy one light get multiple location illumination is very good to consumer.
d. The current night time use LED light has one or more than one of LEDs to offer more than one of locations for illumination and at least one or more of main light, or side or top or bottom lights is angle adjustable to offer near-by areas, location, space be illuminated. Not same as co-inventors co-pending filed case to project LED light beams, patterns, image to remote and distanced locations.
e. The current night time use LED light has circuitry or-and controller to make the COB, or Dice, or Chip or Dip LED(s) has at least one or more combinations of desired functions including
  (e-1) color changing function: from one color to other colors, auto changing, select color,
  (e-2) change functions: from motion-sensor to non-motion sensor, or high-brightness to low-brightness, or
  (e-3) dimmable or adjustable light brightness function,
  (e-4) Power fail or emergency or evacuation light with or without flashlight functions
  (e-5) motion sensor light, photo sensor light, or both, or other sensor(s) Light function Which has one or more than one of the LED light-beam emit out from main or sides or top Or bottom of the said LED light device.

The current invention mainly to disclosure following features for below main application;

1. From FIG. 5, The plug-in outlet (5n) LED night light (500) has COB (5k) light source LED-unit(s) (5i), has;

At least one main LED-unit (5j) arrange within the LED light housing (5a) to emit the light beam to near-by location which is less than 20 feet and brightness is less than 100 CD.

The said main LED-unit (5e) has at least one of COB LED(s) (5c) as light source without focus optic-lens for illumination of near-by location(s) which is shorter than 20 feet and brightness is less than 100 CD.

The said LED light (500) is one of plug-in outlet (5n) night light to get AC power source from prong (5n) and through housing inner AC-to-DC circuit (not shown) or-and circuitry and controller to trigger the said at least one of COB LED(s) (5c) (5k) for desired light functions for indoor or outdoor application(s).

2. From FIG. 5, The Plug-In outlet (5n) or DC powered (5r) LED light (500) has more than one LED-unit(s) (5j) has At least one of main LED-unit(s) (5f) fit into LED main-housing (5a) has LED light source (5c) fit within to offer the near-by location illumination where is shorter than 20 feet and brightness is less than 100 CD not same as outdoor security light has move than 2,600 to 8,000 Lumens and distance is 30-100 feet.

At least one of side (5j) or top (not shown) or bottom (not shown) LED-unit(s) assemble with LED light main-housing (5a) by frame or bar or housing-parts.

The said each of side (5j) or top (not shown) or bottom (not shown) or other extra linkable side light which assembly with 1$^{st}$ side LED-unit(s) (now shown) has LED light source (5j) fit within to offer the other near-by location(s) illumination where is different location of main LED-unit location because the side or top or bottom LED-unit(s) face different with main LED-unit direction also can rotating to side or top or bottom . . .

The said LED light is one of plug-in outlet (5n) light or DC powered light (5r) or transformer (5q) both belong to DC power source.

3. From FIG. 5, The Plug-In outlet (5n) LED light has at least one angle adjustable LED-unit(s) (5j) has;

At least one main LED-unit (5f) arrange within the main-housing (5a) of LED light (500) to emit light-beam to near-by area(s) where is different with outdoor high watt LED security light which has brightness over Min. 2,600 to 8,000 Lumens for distance min. 50 feet to 150 feet. The current invention only less than 20 feet distance for near-by location illumination and brightness is less than 100 CD. So totally different for High-Mounted on Top of Garage door or Roof corner than current invention for low-profits location of wall outlets location or connect with power strips outlets or put on desktop for DC operated unit.

At least one of side (5j) or top or bottom LED-unit(s) assemble with the main-housing (5a) to emit the light-beam to near-by area(s).

At least one adjustable angle construction (5i) here is bar for rotating, or remote control motor to adjust angle by wireless wife, Z-way, Zig-Bee, RF or IR wireless system (not shown) to make the said side or top or bottom LED-unit(s) to change position, orientation, angle (as FIGS. 2 and 3 and 4 shown 2a, 3e, 4g) to make the side (1c) (2a)(3e) (4g) (5j) (6j) or top or bottom LED-unit(s) light-beam to emit to desired location which majority is different illumination locations of the main LED-unit (1a) (2a) (3a)(4a) (5a) (6a) of LED light (100) (200) (300) (400) (500) (600). It is appreciated the said main LED light-unit has alternative or replaceable or equal function for main LED-unit emit the LED light-beam to near-by location by the said indirect-light which the light is from the light-source (6d) which is not face the front area and the LED light-source is face down and the PCB of the light-source (6d) form a shade or cover to let light beam only show on surrounding ditch or groove or lower space for surrounding-light effects as shadow-area (6m) which is not direct light-beam as Top COB LED light source (6n) is face front for direct light-beam emit to front near-by locations.

From FIGS. 5 and 6, The said LED light (500) (600) is plug-in outlet (5n) night light for indoor or outdoor application with preferred circuitry and controller (6e) to turn-on and turn-off each or all or desired number or combination of LED light source(s) inside of the said main (5f) (6c), side (5j) (6j), top (not shown), bottom (not shown) by motion sensor (5e) (6e), power fail detector (6h), photo sensor (5e), pre-determined controller to get near-by location(s) with preferred illumination, functions for example function selection circuitry or-and switch (6f), camera with SD card or wifi with APP software for wireless transmitting digital data of image or sound or conversation to other receiver or LED light for setting, adjustable or desired function (6g), power fail or emergency or evacuation light function (6h), simple camera with SD card for storage captured image or sound or other digital data (5h), USB charger or USB input port, or USB power bank function (5m), color, brightness, kelvin temperatures color or assorted color(s), changing function, selected functions.

From FIG. 5 and FIG. 6 can also see the said LED light is one of the prong (5n) plug-into outlet device, or AC-plug wire (5P) to connect with outlet of power strip or extension cord or generator for outdoor use, or power by DC battery for desk top or stair or multiple door areas application because the current invention can offer more than one of adjustable angle or position or orientation of LED light-beam emit direction. It is appreciated the said DC power not only limited for battery or energy storage device (5r) or outside transformer (5q) to supply the DC current, it also should cover the Power from solar, wind, chemical source and the saved into energy saving unit such as rechargeable batteries should also fall within the current invention.

4. From FIGS. 5 and 6, The Plug-In outlet (5n) LED light (500) (600) has at least one angle adjustable construction (6i) to make the angle adjust of the said LED-unit(s) (5j) (6j), has:

At least one main LED-unit arrange within the main-housing of LED light to emit light-beam to near-by area(s)

At least one of side or top or bottom LED-unit(s) assemble with the main-housing to emit the light-beam to near-by area(s).

At least one adjustable angle construction to make the said side or top or bottom LED-unit(s) to change position, orientation, angle to make the side or top or bottom LED-unit(s) light-beam to emit to desired location.

The said LED light is plug-in outlet night light for indoor or outdoor application with preferred circuitry and controller to turn-on and turn-off each or all or desired number or combination of LED light source(s) inside of the said main, side, top, bottom by motion sensor, power fail detector, photo sensor, pre-determined controller to get near-by location(s) with preferred illumination including direct light source (5k) (6n) or the indirect LED light source (6d), functions as above listed (e1 to e5), color including the cool to warm white or other amber color which good to help people to fall asleep and look like traditional incandescent bulb for color of light beam, brightness which can be low brightness such as less than 1 CD or low light brightness 10-20 CD or high brightness for 40-100 CD which can changeable or selected by pre-design switch or remote controller even had dimmable function changed by VR-kit (6f), kelvin temperatures color or assorted color(s) which mean the LED light has built-in many different color white from 2,500 to 6,500 from warm to cool white color range to let consumer to choice for each main or side or top or bottom LED-unit(s), changing function including hi-low brightness/motion or non-motion selection, selected functions (6f) or as above features (e1 to e5).

From the other basic Drawing of current invention discuss as below;

From the FIG. 1 is one of the preferred embodiment, show a plug-in outlet or battery powered or AC plug-wire powered or USB connection powered or outside transformer powered night time use LED light (100) for indoor or outdoor or camping or outdoor activities application.

The said LED light (100) has main housing (1a) in desired geometric shape or construction for examples the main-housing (1a) has bodies or frame (1b) on several place including right or left top and bottom so form two elongate space to install two of the side-light-unit (1c). The side light-unit has built-in LED light COB source (1e') which also can be dice or chip or dip inside (not shown) if incorporated opaque or white color lens in front so can make improve the brighter spot issues for short distance, or dice or chip or dip LEDs need to have optics-lens or optics-light-medium to make the bright-spot light-beam to spread out to evenly brightness. However, to apply the COB LED (1e') which can reduce this headache bright-spot issues because the COB LED (1e') can be any geometric shape such as round (1e') or rectangular (1e) with eye-catching Lemon-Yellow color or any desired colors with desired diameter, width, length, size or even can have certain flexibility type so even without the front opaque or while lens or optis-lens or optics-light-medium to spread out the strong spot-light beam to even brightness still is eye-catching. The COB LED (1e) (1e') for different geometric shapes also easily assembly with inner circuitry and work with controller to make desired near-by illumination.

From FIG. 1 the LED light has main housing (1a) has 2 side-light-unit (1c) and each side-light-unit (1c) has top and bottom two connect-bar (1d) to assembly with the main-housing (1a) and the two connect-bar (1d) allow side-light-unit (1c) to rotating to adjustable angle and fixed on desired angle so can allow the two side-light-unit(s) (1c) to emit the desired light-beam with desired color or changing color or different kelvin temperatures color of LED light beam to near by areas. The said LED type of the said side-light-units (1c) can any type of LEDs selected from Dip, Dice, Chip, or COB. The current invention preferred to use the COB (1e) or (1e') for simple assembly and simple to offer multiple areas or sections of the said side-light-unit (1c) to illumination such as 4 sides of the side-light-unit (1c). The said side-light-unit (1c) also can be top or bottom light-unit (not show). The said LED light also can be rotated while the LED light is powered by rotatable prong.

From FIG. 1, the LED light main housing (1a) has built-in main-light-unit (1c') to supply the front or arc areas light-beam to near-by areas. The main-light-unit (1c') can be fixed or detachable type or angle tilt to top, bottom, right or left to offer the desired areas for near-by illumination. It is appreciated the main-light-unit can has preferred LED light source including dip or dice or chip or COB LED(s) (1e″) in desired specification, size, color, or multiple colors for one LED, or plurality of different color LED(s) to get different kelvin temperatures white LED including cool white or warm white colors between kelvin temperature color range from 2,500 to 8,000.

From FIG. 1, the LED light main housing main-light-unit (1c') and two side light-unit (1e) connect with the circuitry (not shown) and control unit which can be any function control unit as above discussed. By way of example and without limitation, such as the sensor (1f) which can be motion sensor, photos sensor, vibration sensor, sound sensor. However, one of ordinary skill in the art will readily appreciated that all kind of sensor, switch, power fail detector, always-on to trigger the said main-light-unit (1c') or two or more or top or bottom light-unit (1c) for desired LED light functions may one or more preferred functions selected from
(e-1) color changing function: from one color to other colors, auto changing, select color,
(e-2) change functions: from motion-sensor to non-motion sensor, or high-brightness to low-brightness, or
(e-3) dimmable or adjustable light brightness function,
(e-4) Power fail or emergency or evacuation light with or without flashlight functions
(e-5) motion sensor light, photo sensor light, or both, or other sensor(s) Light function
(e-6) Light performance including chasing, fade-in and fade-out, Auto color changing, Sequential, sound activated light, party light or other functions available from market Place.

The said night time or dark environment LED light of current invention at least have one of the side/top/bottom light-unit (1c) and the main light-unit (1c') has desired geometric shape and size and dimension and preferred lighted area(s) (1c) (1c') or sections(s) (1c') or bodies (1c) (1c') to offer more than one of the near-by illumination and power by preferred prong or USB-port or outside transformer or AC plug-wire for indoor or outdoor light which mainly has no focusing optic-lens to make the remote away location(s) for project light performance or high-power LED light-source which can illuminate the up to 1,000 lumens brightness. The current invention is not high-power LED light source and the brightness is less than 500 lumens or more lower brightness depend on what purpose some application for sleep light only 1 cd or brighter light only 40 cd. However one of ordinary skill in the art will readily appreciated that the current invention brightness should be fall within 1 to 100 CD which is big difference for market available for outdoor security light or security torch light with 2 or more adjustable angle light unit which has more than 1,000 up to 5,000 or 10,000 lumens. And current invention for the definition of near-by location(s) is only less than 20 feet can see the table or chain or pathway, the current invention brightness not to see the coin on the floor under dark environment on 20 feet distance which is not for security light brightness standard. This is main difference with the market outdoor security light.

From the FIG. 2 and FIG. 3 and FIG. 4 show the different LED light has more than one light-unit(s) to offer more than one near-by location illuminations and the said more than one of light-unit(s) can be fixed or movable angle or desired combination for more than one of the LED light-unit (s).

From FIG. 2 show the LED light (200) has the main housing (2a) has one of oval (dot line) shape from all kind of geometric shape and main-housing (2a) front has dome shape motion sensor (2f) and inner has one of LED light source which can be dip or dice or chip or other type LED light source, hereof preferred is COB LED(s) (2d) to emit the directly or indirectly LED light-beam to front near-by location(s) or surrounding groove or ditch of the said main LED-unit(s). The said main-housing (2a) has housing-parts (2b) extend to two sides to assemble with side LED-unit (2c) and the said side LED-unit (2c) has built-in LED light source here preferred is COB LED(s) (2e) for simple installation, less soldering work, super slim thickness, eye-catching coating lemon-yellow color, one COB LED(s) has plurality number of LED dice or chip built-in so can prevent people see ugly yellow or green or white fiber glass or other substrate PCB features and less labor involved for manufacturing. All these features for desired brightness COB LED(s) is much simple and nice and net and value appearance than the plurality of Dice or Chips or Dip LED which has big bright-spot issues especially to tiny LED light space.

From FIG. 2 the said main or side LED-unit (2a) (2e) has built-in COB LED(s) (2d) (2e) which offer the desired brightness and emit to front by direct light source. The said side LED-unit (2c) also has the directly COB LED-unit (2e) to emit light-beam to front and also can emit light-beam to other direction while the side LED-unit (2c) rotate or tilt angle to the position (2j) where is 270 degree of (2j—Dot line shape) position from the original face front (2c—solid line shape). Also the light-beam (2k) show the light beam is emit to 90 degree on right-side from front-position.

These light-beam (2j) from side LED-unit(s) emit to 270 degree location and light-beam (2K) from side LED-unit show 90 degree location and main LED-unit(s) has light-beam emit front location so the said LED light (200) has three lighted-location and these two side light-unit(s) can adjustable from Zero (fixed or permanently is fixed) to 360 degree on along the one of axis of X, or Y, or Z axis. While the said prong (2h) of the said LED light can be rotating, the said lighted-location and change to other axis such as from right-left to top-bottom so can even lighted the ceiling and floor after prong is 90 degree rotate or tilt so offer consumer the said front+right+left illumination or/offer consumer for ceiling+Floor+Front illumination. If the said side/top/bottom LED-unit(s) has linkable construction, the side light-unit(s) can become 2 or more on right or left or top or bottom . . . This is other features. It is appreciated all the ordinary skill of the market should still fall within the current invention and not limited for current invention for the shape, size, light source, angle adjustment, diameter (while is not oval shape for example is Round LED-unit) of the main or side or top or bottom LED-unit(s).

From FIG. 3 show the LED light (300) has main-housing (3a) has housing-parts (3b) to assemble the round shape side LED-unit(s) (3e). The said side LED-unit (3e) has the built-in desired LED light source and the light-source is arrange into the curve (3f) or sphere surface (3f) for certain purpose such as offer more wider illuminated-location(s) like (3f) or concentrate the LED light-beam as traditional skill of reflector shape (3g) or any other desired other shape for other purpose. The said main-housing 93a) has built-in preferred LED light source here is COB LED(s) (3c) and has rotatable or adjustable prong. The circuitry or IC or electric parts & accessories (not shown) incorporate with controller here is a dome motion sensor (3j) with other selector such as function selector (3d) which can have desired function choice from above discussed (e1 to e6) so can get pre-determined light functions. While the side/top/bottom LED-unit has light passing material, It also can make the ball or other geometric shape side/top/bottom LED-unit(s) to glow while well design the LED light source light-beam arrangement. From FIG. 3 also show the side/top/bottom LED-unit(s) need have freely rotating or tilting or move so the any geometric shape of side/top/bottom LED-unit(s) has to have enough distance (D) (3i) to away from the outlet location surface or wall to make freely rotating, move, tilting without touch the wall or surface of outlets existing place.

From FIG. 4 show the LED light (400) show the half-ball shape out of all geometric-shapes. The said main-housing (4a0 has the built-in LED light source which is plurality of piece or colors or brightness or shape of LED chip, dice, dip or COB-LED(s) with front cosmetic-element such as shaped opening(s) (4c), cutout(s) (4c), textured lens (es) (4c), color filter (4c), windows (not punch-through) (4c), stencil (4c), or opage-treatment (4c) or white lens or plastic piece or painting (4c) but not a focusing element for projection light beam with optics focus properties existing.

From FIG. 4, the said main-housing (4a) has extend housing-parts (4f) to assembled moveable, adjust angle, rotatable Side or top or bottom LED-unit(s) (4g) each of the side/top/bottom LED-unit(s) has built-in desired LED light source (4h). From FIG. 4 right side can see the half-ball From original face front and dome lens is emit light to arc range which position from clock dial face 21:00 to 03:00 range) of near-by lighted location and rotated 270 degree (4i) the light-beam will emit the other arc lighted-location which position from Clock dial face 13:00 to 19:00 range.

The LED light (400) can be powered by prong (4d) or DC power source (4e) and the half-ball side LED-unit (4g) any position will away from the wall of outlet location because main housing has sufficient distance (D) from wall to the top of the side LED-unit highest points or housing.

From FIGS. 5 and 6 as above discussed for 4 main features of the current invention.

It is appreciated all the alternative or replaceable or equal functions for the above discuss the LED light, main/side/top/bottom LED-unit, LED light source, circuitry, controller, functions, color, moving, fixed prong, rotating prong or movable sensor, adjustable horizon of LED light angle or other ordinary skill in the art should still fall within the current invention scope and not limited for disclosure drawing, details specification.

The invention claimed is:

1. A plug-in chip on board (COB) night light, comprising:
a main housing;
at least one side, top, or bottom pivotal light housing that is directly and pivotally connected to the main housing by pivot members included in the main housing or extending from the main housing to the pivotal light housing;
a first LED unit including a first LED positioned in and fixed to the main housing; and
a second LED unit including a second LED positioned in and fixed to the at least one pivotal housing,
whereby the first LED fixed to the main housing is not movable relative to the main housing, and
whereby the second LED fixed to the pivotal housing is movable relative to the main housing,
wherein at least one of the first LED unit or the second LED unit is a COB light unit, wherein the COB night light is connected with an AC power source by built-in prongs,
an AC-to-DC circuit and a controller, to trigger or control the at least one COB light source to provide desired light functions for indoor or outdoor applications, and
wherein the prongs fixedly extend from the main housing.

2. A plug-in chip on board (COB) night light as claimed in claim 1, wherein each of the first LED unit and the second LED unit is a COB light unit.

3. A plug-in chip on board (COB) night light as claimed in claim 1, wherein the COB night light includes parts selected from a (1) sensor, (2) motion sensor, (3) photo sensor, (4) vibration sensor, (5) heat sensor, (6) power fail detector; to trigger the at least one COB light source to provide the desired light functions.

4. A plug-in chip on board (COB) night light as claimed in claim 1, wherein the COB night light has at least one function selected from:
(i) a color changing function;
(ii) a change function to change between (ii-1) motion sensor and non-motion sensor, or (ii-2) high and low brightness;
(iii) a dimmer or adjustable light brightness function;
(iv) a power fail, emergency, or evacuation function;
(v) a motion sensor and/or photosensor function;
(vi) a light performance function selected from (a) chasing, (b) fade-in and fade-out, (c) auto color changing, (d) sequential, (e) sound-activating, and (f) party light functions;
(vii) a function controlled by at least one part selected from (1) an integrated circuit, (2) a wireless system, and (3) wireless connection selected from Z-way, ZigBee, Bluetooth, Wi-Fi, with a downloaded app.

5. A plug-in chip on board (COB) night light, comprising:
a first COB unit including a COB light source having a plurality of chip or dice LEDs directly sealed within a coating material;
a main housing in which the first COB unit is fixed and which includes a battery or from which AC prongs extend; and
at least one separate side, top, or bottom pivotal housing that is directly and pivotally connected to the main housing by pivot members included in the main housing or extending from the main housing to the pivotal housing, and to which a built-in LED unit having at least one LED, or a second COB unit, is fixed,
whereby the first COB fixed to the main housing is not movable relative to the main housing, and
whereby the built-in LED unit or the second COB unit fixed to the pivotal housing is movable relative to the main housing.

6. A plug-in chip on board (COB) night light as claimed in claim 5, wherein each of the main housing and the separate side, top, or bottom light each includes at least one said COB light source, and each said COB light source is configured to be activated by a photo sensor and motion sensor to emit light to one or more areas, wherein the night light is further configured enable adjustment of parts or a housing to (1) adjust or change an illumination direction or area, or (2) rotate or adjust an angle of prongs.

7. A plug-in chip on board (COB) night light as claimed in claim 5, wherein (a) the main housing, and (b) the separate side, top, or bottom light unit, each has a COB unit or at least one LED having light functions selected from (1) a motion sensor light, (2) a dimmable light, (3) a high-low brightness light, (4) a wireless, IR, RF, or Wi-Fi control light, (5) a power fail light.

8. A plug-in chip on board (COB) night light as claimed in claim 5, wherein at least one of (1) the main housing and (2) the separate top, bottom, or side light unit is incorporated with an integrated circuit and has a function selected from:
(i) a color changing function;
(ii) a change function to change between (ii-1) motion sensor and non-motion sensor, or (ii-2) high and low brightness;
(iii) a dimmer or adjustable light brightness function;
(iv) a power fail, emergency, or evacuation function or illumination;
(v) a motion sensor and/or photosensor function;
(vi) a light performance function selected from (a) chasing, (b) fade-in and fade-out, (c) auto color changing, (d) sequential, (e) sound-activating, and (f) party light functions;
(vii) a function controlled by one of (1) an integrated circuit, (2) a wireless system, and (3) wireless connection selected from Z-way, ZigBee, Bluetooth, Wi-Fi, with a downloaded app.

9. A plug-in chip on board (COB) night light as claimed in claim 5, wherein each of the main housing and the separate side, top, or bottom light unit has a built-in camera system to capture photo, image, video, and or audio digital data.

10. A plug-in chip on board (COB) night light as claimed in claim 5, wherein more than one said main housing or separate side, top, or bottom light unit has a USB charger function and/or a USB power bank function through a USB port to (1) supply DC to other products, and/or (2) input the DC power to the COB night light.

* * * * *